June 22, 1937.   G. A. HOLMES   2,084,558
TURN BUTTON FASTENER
Filed Oct. 2, 1935

Inventor:
George A. Holmes
by Walter S. Jones
Atty.

Patented June 22, 1937

2,084,558

UNITED STATES PATENT OFFICE 2,084,558

TURN-BUTTON FASTENER

George A. Holmes, Newton Center, Mass., assignor to United-Carr Fastener Corporation, Cambridge, Mass., a corporation of Massachusetts Application October 2, 1935, Serial No. 43,234

15 Claims. (Cl. 24—221)

This invention relates to improvements in a fastening means for detachably securing a cowling or the like to a support such as the framework of an automobile or aeroplane.

In the drawing, which illustrates a preferred embodiment of my invention:—

An object of my invention is to provide a new and improved means for detachably securing a cowling, used in connection with an automobile or aeroplane, to a supporting part. I do not wish to limit my invention to such uses because there are many other purposes to which it could be advantageously applied, but as my fastening device is especially adapted, because of its easy operation, firm holding qualities and other improved features, to a cowling installation, it is best described in connection with the same.

The fastening device which I have employed to carry out the above objects, the particular features of which will be more fully set forth below, consists of a fastener of a modified turn-button type, one part of which is attached to a supporting plate and its cooperating part assembled with the cowling. In the following description the part carried by the support will be referred to as the support member, and the part carried by the cowling as the cowling member.

Figure 3:
Fig. 3 is a side view of the support and support member with the cowling locked in position.

Referring more particularly to the accompanying drawing, I have shown in Fig. 3 a cowling plate 1 and a supporting plate 2 secured together by means of my improved fastening device of which only that part of the fastener secured to the supporting plate is visible. The cooperating cowling member, comprising the socket part of my device, has one end located in and concealed by the support member and the other end lying flush with the outside surface of the cowling plate.

Figure 2:
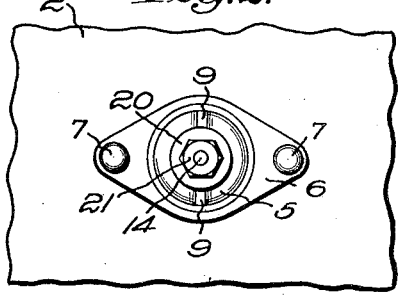
Fig. 2 is a plan of the support member of my fastening device viewed from the inside of the support to which it is attached.
Figure 5:
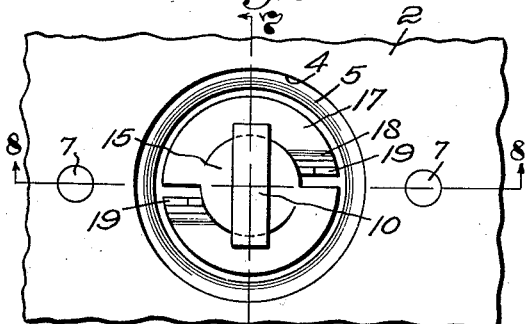
Fig. 5 is a plan of the support member viewed from outside the support.
Figure 6:
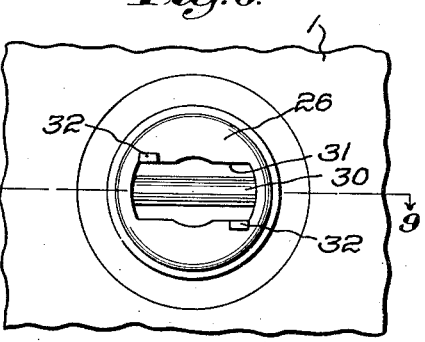
Fig. 6 is a plan of the cowling member viewed from inside the cowling.
Figure 7:
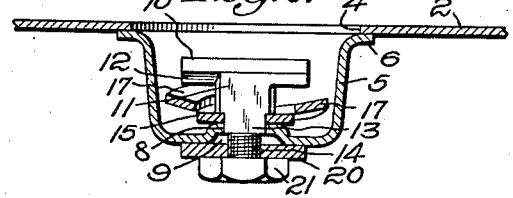
Fig. 7 is a section taken on the line 7—7 of Fig. 5.
Figure 8:
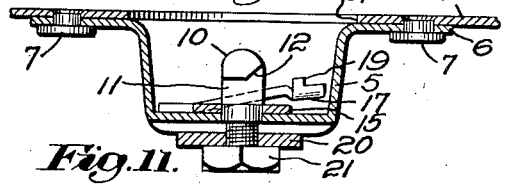
Fig. 8 is a section taken on the line 8—8 of Fig. 5.
Figure 10:
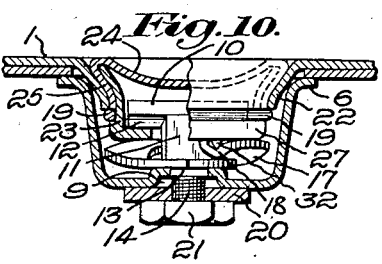
Fig. 10 is a fragmentary section of the fastening members in locked position.

Referring particularly to the support member of my fastening device, I have shown in Figs. 5, 7 and 8 a supporting plate 2 having a relatively large aperture 4. A cup-shaped eyelet 5 is provided having the flanges 6 overlying the inside face of the plate so that the eyelet may be secured to the plate by any suitable means such as the rivets 7. When the eyelet is secured in correct position, the open end is in alignment with the aperture 4 of the support. The closed end of the eyelet is provided with a square aperture as at 8 and a groove 9 (Figs. 2 and 7) extending the width of the closed end for the purposes which will be hereinafter described.

Located within the eyelet 5 is a stud member adapted for fastening engagement with the cooperating socket member carried by the cowling plate 1. The stud member in my preferred form, as best illustrated in Fig. 7, has a T-shaped head having the end portions 10 and the intermediate portion 11. The end portions 10 are slightly bevelled on opposite sides as at 12. The intermediate portion 11 extends away from the end portions 10 to form the square stem portion 13 which is reduced in width from the portion 11 and positioned between the portion 11 and a threaded shank 14.

Figure 11:
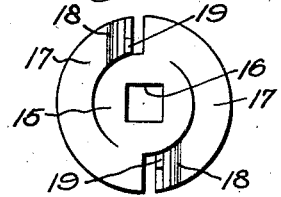
Fig. 11 is a plan view of the spring-retaining means.

I have also provided within the eyelet a retaining member 15 which is assembled with the stud member and adapted for cooperative fastening engagement with means located on the cowling member to prevent the unintentional disengagement of the members when they are in locked position. The member 15, as best illustrated in Fig. 11, is preferably circular in shape comprising a flat metal washer-like plate having a square aperture 16 disposed in the center. Two spring arms 17 formed from the material of the plate are bent outwardly in a gradual slope from the plane of the plate and extend in the same direction. Groove-like indentations 18 are provided in the spring arms in close proximity to the free ends thereof, and the relatively small projections 19 are struck up from the arms between the grooves 18 and the free ends for the purpose which will be hereinafter more fully described.

In assembling the parts of the support member together, the member 15 is placed within the eyelet 5 adjacent to the groove 9 located at the bottom of the eyelet so that the aperture 16 is in alignment with the aperture 8 of the eyelet bottom. The spring arms 17 extend in the direction of the open end of the cup, as shown in Fig. 7. The shank 14 of the stud member is then passed through the square apertures of the retaining member and eyelet bottom until the relatively square stem portion 13 is seated within the said apertures, in which position the intermediate portion 11 will bear upon the walls surrounding the aperture 16 serving to space the end portions 10 from the member 15.

As a result of this assembly, the threaded shank 14 will pass through the bottom of the eyelet a sufficient distance to allow the washer 20 and the nut 21 to be engaged therewith. The free end of the shank 14 may then be headed over to prevent any unloosement of the nut and, by means of this fastening arrangement, the stud and retaining members are rigidly secured to the eyelet. The square construction of the stem and apertures serves to prevent any rotation of the parts during the tightening of the nut on the shank or during the engaging operation of the fastener members.

Figure 9:
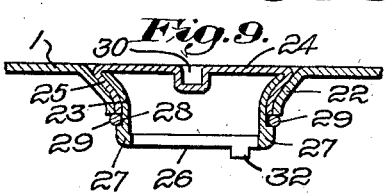
Fig. 9 is a section taken on the line 9—9 of Fig. 6.

The cowling 1 is provided at spaced intervals with the apertured tubular-shaped portions 22 which are drawn out of the cowling plate as best illustrated in Fig. 9. Seated within the portions 22 and adapted to rotate therein are the cowling members which, as shown in Fig. 9, include a circular eyelet 23, the sides of which are curved out slightly to follow the direction of the walls of the tubular portion 22. A cap member 24 is secured over the open end of the eyelet 23 having a flange 25 which extends for a predetermined distance along the sides of the eyelet toward the bottom 26 of the eyelet. The bottom of the eyelet is slightly flanged as at 27, whereby an annular groove 28 is formed on the sides of the cowling member between the flange 27 and the free ends of the flange 25 of the cap 24.

Figure 1:
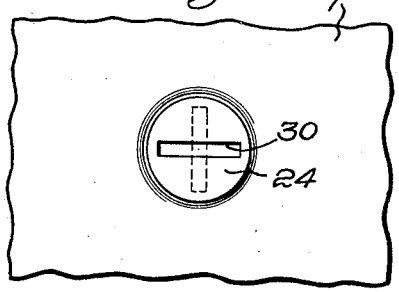
Figure 1 is a plan of the cowling member of my fastening device viewed from outside the cowling to which it is attached.

When the socket member is located in the portion 22, the surface of the cap will lie substantially flush with the plane of the cowling plate and the eyelet portion will extend through the portion 22 so that the groove 28 will lie outside the tubular portion of the cowling plate. A split ring 29 is located within the groove 28 and adapted to engage the free walls of the portion 22, thereby preventing the cowling member from slipping backwardly out of its seat. A slot 30 is provided in the surface of the cap (Figs. 1 and 9) adapted to receive a coin or other means for rotating the member.

In the bottom surface 26 of the eyelet 23, I have formed an oblate aperture 31 which is shaped to pass the head of the stud member. Projections 32 are located at opposite diagonal corners of the aperture adjacent to the edges of the aperture.

Figure 4:
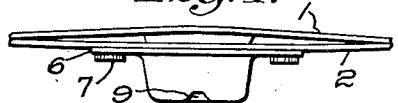
Fig. 4 is a view similar to that in Fig. 3, showing the cowling positioned ready for final locking engagement with the support.

In fastening the parts 1 and 2 together, the cowling member is entered through the aperture 4 of the plate 2 and into the eyelet of the support member so that the oblate aperture 31 will pass the head of the stud member. In this position the parts will appear substantially as shown in Fig. 4. Then by a coin or other suitable tool the cowling member is turned approximately 90° so that the aperture 31 is spanned by the head of the stud member. The slot 30 will now take the position illustrated by the dotted lines in Fig. 1.

During the aforementioned turning action, material of the inner face of the bottom 26 of the eyelet 23 adjacent the aperture 31 engages and rides over the bevelled portions 12 of the end portions 10 thereby causing a camming action which draws the plates 1 and 2 adjacent to each other as shown in Fig. 3. Also, during the turning action the projections 32 engage the sloping arm portions 17 of the retaining member 15 and contract the spring arms by a camming action until the aperture 31 is spanned by the stud, at which time the projections snap into the grooves 18 and are held therein by spring action. While the projections and the retaining member are engaged in this manner, it is impossible for the stud member to be unintentionally disengaged from the socket member, detachment of the members being possible only by turning the socket in a direction opposite to that by which the members were engaged, during which backward rotation the reverse of the foregoing action will take place. The projections 19 adjacent to the ends of the spring arms prevent the projections 32 of the cowling member from being rotated past the groove during the fastening operation and also make it impossible to turn the socket member in the wrong direction for detachment of the fasteners. The groove 9 is adapted to space the member 15 from the bottom of the eyelet so that the arms 17 will have sufficient space in which to contract and expand for the purposes described.

The great improvement of my invention over previous inventions of the same class lies in the fact that there are no stresses upon the retaining member in no matter to what use the fastener may be put. All strains and stresses are taken up by the stud and material surrounding the socket aperture 26 with the result that a much stronger and more reliable fastener is provided. Furthermore, since the stud is rigid, axial separating stresses between the parts are taken up by the rigid stud and there is no yielding action against a spring, as has been the case in previously used fasteners of the turn-button type.

Due to the fact that the outside face of the cowling member lies flush with the cowling plate, the fastening offers no wind resistance and for that reason is especially useful for aeroplane purposes.

While I have described a preferred form of my invention, it will be understood that changes involving omission, substitution, alteration and reversal of parts may be made without departing from the scope of my invention, which is best defined in the following claims.

I claim:

1. A fastening device comprising parts to be fastened together, and separate co-engaging fastening members, one of said members mounted on one of said parts having a shouldered stud rigidly assembled therewith, the other of said members swivelly mounted on the other of said parts and having an aperture to receive said stud and also having means adjacent to said aperture for engagement with the shouldered stud by turning said last member to detachably fasten said parts together.

2. A fastening device comprising parts to be fastened together, and separate co-engaging fastening members, one of said members mounted on one of said parts having a shouldered stud rigidly assembled therewith, the other of said members swivelly mounted on the other of said parts and having an aperture to receive said stud adapted to be spanned by the shoulder of said stud when said last member is in one position, and said members having co-acting engaging means to prevent the unintentional rotation of said last member when said aperture is spanned by said shoulder.

3. In combination with a pair of apertured parts, a fastening device comprising a cup-shaped eyelet mounted on one plate in alignment with the aperture therein, a shouldered stud member rigidly secured within said eyelet, and an apertured socket member swivelly mounted within the aperture of said other part, the aperture of said socket member adapted to receive said stud member in one position of said socket member and also having means adjacent to said aperture to engage the shoulder of said stud in another position of the socket member to secure the parts together.

4. In combination with a pair of apertured parts, a fastening device comprising a cup-shaped eyelet mounted on one plate in alignment with the aperture therein, a T-shaped stud member having a head portion and a stem portion secured within said eyelet, and a socket member swivelly mounted within the aperture of said other part and extending through the aperture of said first part into said eyelet, the portion of said socket member facing said eyelet having an oblate opening therein adapted to receive the head of said stud member in one position of said socket member and be spanned by the head of said stud member in another position of the socket member to secure the parts together.

5. In combination with a pair of apertured parts, a fastening device comprising an apertured cup-shaped eyelet mounted on one part in alignment with the aperture therein, a shouldered stud member rigidly secured within said eyelet and a socket member swivelly mounted within the aperture of said other part, said socket member having an aperture adapted to receive said stud member in one position of said socket member and said aperture surrounded by a wall portion adapted to engage the shoulders of said stud in another position of said socket member to secure the parts together, and said stud and socket members having coacting engaging means associated therewith whereby the socket member is locked against unintentional displacement when said shoulders are engaged by said wall portion.

6. In combination with a pair of apertured parts, a fastening device comprising an apertured cup-shaped eyelet mounted on one plate in alignment with the aperture therein, a T-shaped stud-member having a head portion and a stem portion secured within said eyelet, a retaining means located within said eyelet, and a socket member swivelly mounted within the aperture of said other part and extending through the aperture of said first part into said eyelet, the portion of said socket member facing said eyelet having an oblate opening therein adapted to pass the head of said stud member in one position of said socket member and be spanned by the head of said stud member in another position to secure the parts together and said socket member having an element engaging said retaining means for the purpose of locking the socket member against unintentional displacement when said aperture is spanned by said head.

7. In combination with a pair of apertured parts, a fastening device comprising an apertured cup-shaped eyelet mounted on one plate in alignment with the aperture therein, a shouldered stud member rigidly secured within said eyelet and a retaining member assembled therewith, said retaining member comprising a metal plate having spring portions bent from the plane of said plate, said spring portions having grooves in the marginal ends thereof, and a socket member swivelly mounted within the aperture of said other part and extending through the aperture of said first part into said eyelet, the portion of said socket member facing said eyelet having an opening therein surrounded by a wall, said wall adapted to engage said stud member when said members are in fastened relation, said socket member having projections adapted for camming engagement with said spring portions during rotation of said socket member whereby said projections are forced into said grooves and held therein against unintentional rotation of said socket member when said stud member is engaged by said wall.

8. In combination with a pair of apertured parts, a fastening device comprising an apertured cup-shaped eyelet mounted on one plate in alignment with the aperture therein, an apertured retaining means within said eyelet, a stud member having a head and stem portion, said stem portion extending through the aperture of said retaining means and said eyelet and means rigidly securing said stud member to said eyelet whereby all the parts are in assembled relation, and an apertured socket member swivelly mounted within the aperture of said other part and extending through the aperture of said first part into said eyelet, the aperture of said socket member adapted to receive the head of said stud member in one position and be spanned by said head in another position, said socket member having integral elements engaging said retaining means whereby said socket member is locked against unintentional displacement when said aperture is spanned by said head.

9. In combination with a pair of apertured parts, a fastening device comprising an apertured cup-shaped eyelet mounted on one plate in alignment with the aperture therein, a retaining means located within said eyelet and adjacent to the bottom thereof, said means comprising an apertured plate and grooved spring portions bent from the material of said plate out of the plane of said plate, a stud member having a T-shaped head and a stem portion extending from said head through the apertures of said plate and said eyelet and means securing said stud member to said eyelet whereby all the parts are in assembled relation, and a socket member swivelly mounted within the aperture of said other part and extending through the aperture of said first part into said eyelet, said socket member having an apertured face opposite said eyelet adapted to receive said head in one position and be spanned by said head in another position, said face having integral projections adapted for camming engagement with said spring portions during rotation of said socket member whereby said projections are snapped into said grooves, said grooves and projections cooperating to prevent unintentional rotation of said socket member when said aperture is spanned by said head, and said socket member having means whereby said member may be rotated for engagement and disengagement with said stud member.

10. In combination with a part having an aperture and a part having an apertured tubular portion drawn from said latter part, a fastening device comprising an apertured cup-shaped eyelet mounted on said first part in alignment with the aperture therein, a shouldered stud member rigidly secured within said eyelet and a socket member swively mounted within said tubular portion, said socket member comprising a cup-shaped eyelet having a cap portion adapted to lie flush with the outside surface of said latter part, said eyelet having an aperture surrounded by a wall portion, said member having means whereby it is secured within said tubular portion and means connected with said cap for rotating said socket member thereby to engage said wall portion with said stud member, and said stud and socket members having coacting engaging means associated therewith whereby the socket member is locked against unintentional displacement when said wall is engaged by said stud.

11. In combination with a part having an aperture and a part having an apertured tubular portion drawn from said latter part, a fastening device comprising an apertured cup-shaped eyelet mounted on said first part in alignment with the aperture therein, a shouldered stud member rigidly secured within said eyelet, a retaining member having a pair of spring arms extending in the same direction located within said eyelet and assembled with said stud, and a socket member swively mounted within said tubular portion, said socket member comprising a cup-shaped eyelet having a bottom and side walls bent to follow the contour of said tubular portion, a cap secured to the open end of said eyelet, said cap portion lying flush with the outside surface of said part and having a tool-receiving slot located therein, said member having means whereby it is secured within said tubular portion, the bottom of said eyelet having an oblate opening therein, a wall portion adjacent to said opening adapted for fastening engagement with said stud member, and projections located at opposite diagonal corners of said opening adjacent to said opening adapted to engage said retaining member for the purpose of locking the socket member against unintentional displacement when said stud is engaged by said wall portion.

12. A fastening device comprising parts to be fastened together, and separate co-engaging fastener members mounted on said parts, one of said members having a shouldered stud rigidly assembled therewith, the other of said members having an aperture to receive said stud and adapted to be spanned by the shoulder of said stud when said members are in proper relative positions, one of said members being rotatably mounted on its respective part, and said members having co-acting engaging means to prevent the unintentional rotation of said rotatably mounted member.

13. In combination with a pair of apertured parts, a fastening device comprising an apertured cup-shaped eyelet mounted on one plate in alignment with the aperture therein, a shouldered stud having a bevelled means thereon, said stud rigidly secured within said eyelet, and a socket member swivelly mounted within the aperture of said other part, the portion of said socket member facing said eyelet having an opening therein, said socket member adapted to be rotated whereby said wall will movably engage said stud until said opening is spanned by said stud, and said socket member having projections adapted to engage and ride over the bevelled construction of said stud during first engagement of said wall by said stud whereby said apertured parts are drawn adjacent to each other.

14. In combination with a pair of apertured parts, a fastening device comprising an apertured cup-shaped eyelet mounted on one plate in alignment with the aperture therein, a shouldered stud member having a bevelled means thereon, said stud member rigidly secured within said eyelet, and a retaining member assembled therewith, and a socket member rotatably mounted within the aperture of said other part, the portion of said socket member facing said eyelet having an opening therein surrounded by a wall, said wall adapted to engage said stud member when said members are in fastened relation, and said socket member having projections adapted to engage and ride over said bevelled construction during first rotation of said socket member whereby said plates are drawn adjacent to each other, and said projections adapted to engage said retaining member during further rotation of said socket member for the purpose of locking the socket member against unintentional displacement when said members are in final fastened relation.

15. In combination with a pair of apertured parts, a fastening device comprising an apertured cup-shaped eyelet mounted on one plate in alignment with the aperture therein, a retaining means located within said eyelet and adjacent to the bottom thereof, said means comprising an apertured plate and grooved spring portions bent from the material of said plate out of the plane of said plate, a stud member having a T-shaped head and a stem portion extending from said head through the apertures of said plate and said eyelet, said head having a bevelled construction on opposite sides thereof, and means securing said stud member to said eyelet whereby all the parts are in assembled relation, and a socket member swivelly mounted within the aperture of said other part, said socket member having an apertured face adapted to receive said head in one position and said socket member adapted to rotate whereby said face is spanned by said head in final position, said face having integral projections adapted to engage and ride over said bevelled construction of said head during first rotative movements of said socket member whereby said apertured parts are drawn adjacent to each other by a camming action, and said projections adapted for camming engagement with said spring portions during further rotative movements of said socket member whereby said projections are snapped into said grooves, said grooves and projections cooperating to prevent unintentional rotation of said socket member when said aperture is spanned by said head.

GEORGE A. HOLMES.